United States Patent [19]

Strathmann et al.

[11] Patent Number: 4,737,260
[45] Date of Patent: Apr. 12, 1988

[54] MEMBRANE STACK UNIT FOR MULTI-CHAMBER ELECTRODIALYSIS

[75] Inventors: Heiner Strathmann, Tubingen; Harm Schmoldt, Hamburg, both of Fed. Rep. of Germany

[73] Assignee: Stantech GmbH, Hamburg, Fed. Rep. of Germany

[21] Appl. No.: 918,543

[22] Filed: Oct. 14, 1986

[30] Foreign Application Priority Data

Oct. 16, 1985 [DE] Fed. Rep. of Germany ....... 3536778

[51] Int. Cl.⁴ ............................................. B01D 13/02
[52] U.S. Cl. .................................................... 204/301
[58] Field of Search ................ 204/301, 180.1, 299 R, 204/182.3

[56] References Cited

U.S. PATENT DOCUMENTS

| | | | |
|---|---|---|---|
| 3,933,617 | 1/1976 | Yamamoto et al. | 204/301 |
| 4,172,779 | 10/1979 | Yamaguchi et al. | 204/301 |
| 4,303,493 | 12/1981 | Kneifel et al. | 204/301 |
| 4,350,581 | 9/1982 | Schmoldt et al. | 204/301 |
| 4,600,493 | 7/1986 | Korngold | 204/301 |

FOREIGN PATENT DOCUMENTS 2946284  5/1981  Fed. Rep. of Germany .
3219869 12/1983  Fed. Rep. of Germany .

OTHER PUBLICATIONS

Brochure entitled "Stantech Electrodialysis Systems".
Strathmann et al., Chem.-Ing.-Tech., vol. 56, pp. 214–220 (1984).

Primary Examiner—John F. Niebling
Assistant Examiner—Ben C. Hsing

[57] ABSTRACT

A membrane stack unit for multi-compartment electrodialysis having pairs of mirror-image cell frame parts having an ion-selective membrane between them, the frame parts having supply and connection holes and distribution hole systems which mate with each other and with other said pairs and with end plates to provide up to four different process streams.

5 Claims, 8 Drawing Sheets

MEMBRANE STACK UNIT FOR MULTI-CHAMBER ELECTRODIALYSIS

The invention concerns a membrane stack unit for electrodialysis multi-compartment processes.

The transport of ions through suitable membranes under the action of an electric field is called "electrodialysis". Likewise, apparatus for electrodialysis has been known for a long time, where ion-exchange membranes are disposed so that alternating well-defined anion/cation exchanger membrane sequences are arranged between two electrodes and divide the interior space of the apparatus into narrow compartments. When appropriate ionic solutions flow through these compartments, volume-streams that are depleted in salt are obtained under the action of an electric field, since the cations can pass only through the cation exchanger membranes and the anions only through the anion exchanger membranes. Here the corresponding ions are enriched counter to the concentration gradients.

In practical application of electrodialysis, the individual corresponding cells are continuously flushed with a diluted and a concentrated solution. It is especially important for the economy of the process that the flow rate and the flow distribution are as uniform as possible in all the cells, so that no concentration polarization can occur at the membrane surfaces. Furthermore, one must avoid transfer of the concentrated solution into the dilute solution caused by a lack of tightness of the compartments that are separated by ion exchanger membranes, as well as leakages to the outside. The design of the electrodialysis compartments thus represents a considerable problem in the construction of a technical electrodialysis system, especially against the background of the fact that the thinnest possible compartments strongly enhance the economy of the process.

With most electrodialysis systems that are in use today, the membranes are separated from one another by a plastic frame. The plastic frames are disposed either on top of one another or next to one another, and they have holes for feeding in and for draining the desalinated and the concentrated solution into or out of the corresponding cells. The membranes are mechanically sealed on the frame. Since the individual compartments for concentrated and depleted solutions are disposed alternatingly in a cell packet in an appropriate sequence, the infeed or drainage of the concentrate or of the depleted solution respectively must likewise occur alternatingly into or out of the cells.

Up to now, the flow in a cell generally was diagonal from one corner of the cell, and the solution was drained at the opposite side of the cell, so that the flow of the concentrate and the depleted solution on the two sides of the membrane occurs in precisely opposite diagonal directions. On the one hand, this causes a non-optimal flow distribution in the compartments, and thus zones with low mixing and therefore with a higher concentration polarization will form. Due to the different flow in the individual chambers, differences in the pressure gradients between the compartments with the concentrated and with the depleted solution also occur; this results in locally limited but sometimes high pressure differences between the individual cells. This causes additional mechanical stress on each individual membrane and, under some circumstances, can change the cell geometry, which again unfavorably influences the flow distribution.

When rough membrane materials are used, additional problems occur with the mechanical sealing of the individual compartments with respect to one another. Thus solution exits from the cell packet between the individual cell frames, or the concentrated and already depleted solutions are even exchanged. The economy of the desalination of the ionic solutions by means of electrodialysis is thus significantly influenced.

The design of a membrane stack with uniform flow for the desalination of a sodium chloride solution with two solution streams, as well as the basic conception of a cell frame suitable for performing such a desalination are known from the DE-OS No. 29 46 284. However, with the proposed design of the membrane stack, no so-called multi-compartment processes can be performed, whose objective is to separate or to treat several different dissolved components from solutions and waste waters under economic conditions. This plays a role, for example, when valuable dissolved materials are to be recovered or are to be reinjected into the separation process anew by recycling. The membrane stacks proposed in the DE-OS No. 29 46 284 do not envision an infeed and drainage of more than two solution flows, nor do they make this possible by simple technical additional measures.

In connection with so-called "multi-compartment processes", membrane stacks for laboratory operation are known, where the compartments have their individual flows. However, these compartments are more than 5 mm thick; if the number of compartments is increased and/or if the membrane surface is enlarged, this leads to membrane stacks of impractical size. Furthermore, when the compartments have individual flows, difficulties are known to occur again and again in the affixing of common infeed and drainage lines. The economy of this membrane separation method depends essentially on the compartment thickness; with such thick compartments, this process is quite uneconomical on a large scale.

The DE-OS No. 32 19 869 discloses membrane stack units where the four sides of a square cell frame are alternately used by applying the familiar double-loop stack technique, in order to create four separate infeed and drainage circulations. This is achieved by disposing two successive cell frames always at an angle of 90° with respect to one another, which necessarily presupposes a square frame geometry. Stack units constructed in this fashion, however, can be used in a way that is technically and economically sensible only up to a certain size. The application limits are set by the fact that every enlargement of the membrane surface is associated with a corresponding enlargement of the side length of the cell-frame square. Even with a relatively small increase of the membrane surface of a cell, this leads to impractically unwieldy membrane stacks. On the other hand, the current pattern in the alternatingly disposed stack units, which are always turned by 90° with respect to one another, and the pressure drop in each cell, which rises in the flow direction, cause local pressure differences between neighboring cells. As already mentioned, a perfect and reproducible flow pattern of the solutions in large cells is then no longer guaranteed. The local pressure differences which form between the individual cells are a function of the side length of the cell-frame square; with comparatively large cell surfaces and thus with large side lengths of the cell-frame squares, the very limited, in any case relatively low strength of the membranes is no longer sufficient to reliably take up the pressure differences from the diagonal flow pattern.

In this embodiment, the flow pattern is necessarily diagonal. With large membrane surfaces, this furthermore entails undesirable concentration-gradient fields. Thus, with a large-scale application of the membrane stack unit described in the DE-OS No. 32 19 869, elevated and thus problematical concentration polarization will form.

The basic aim of the present invention now is to design a membrane stack unit with up to four separate circulations, in such a fashion that the separation of several components from a solution or another treatment of several solution streams become possible in one working step, without the above-described disadvantages arising as regards pressure differences from the flow pattern, tightness, as well as the unwieldiness of the membrane stack units and the membrane stacks constructed from them.

The invention concerns a membrane stack unit for multi-compartment processes of electrodialysis, comprising: several ion-selective membrane, end plates with equipment for the infeed and drainage of the solutions being treated; the corresponding supply and connection systems and the electrodes; as well as two-part cell frames, where the respectively associated ion-selective membrane is placed and/or fastened on one frame surface while the respectively other cell-frame surfaces are placed between two neighboring membranes, so as to form a dialysis compartment, characterized as follows:

(a) Each two mutually neighboring cell-frame parts (3), which form an electrodialysis compartment of the membrane stack, are constructed in mirror-image fashion with respect to one another, relative to a plane which runs between them parallel to the membrane (30); (b) all cell-frame parts (3) of the membrane-stack unit have supply and connection holes (8, 9) and (10, 11) with a suitable cross-sectional shape, perpendicular to the membrane plane, where said supply and connection holes are situated on precisely opposite side edges (1, 2) which additionally act as a sealing surface, and where said supply and connection holes individually have a hydraulic cross section of about 100 to 500 mm² and are alternatingly connected with the infeed and drainage units (33, 34) of the end plates (35, 36); (c) every two cell-frame parts (3) which form an electrodialysis compartment in the membrane-stack unit have distribution hole systems (4, 5) parallel to the sealing surface, where said distribution hole systems connect the supply holes (8, 9) and (10, 11) with the interior of the compartment (6) in ray-like fashion, and individually have hydraulic cross sections of 0.04 to 6.5 mm², and which are defined by the two cell-frame units (3) that are disposed in mirror-image fashion with respect to one another, one-half each; (d) the penetrating supply and connection holes (8, 9) and 10, (11) as well as the distribution hole systems (4, 5) are sealed flat against the environment by the frames themselves without contour seals; and (e) frames and end plates of only two different types are present, which can be arranged to form stacks with up to four different process streams.

The supply and distribution holes are arranged on two mutually opposite side edges of the cell frames. They connect with one another the individual electrodialysis compartments of the same separation step. They also connect the corresponding supply and distribution systems of the end plates. In general, these holes are affixed on the narrow sides of the rectangular cell frame. The fact that only two mutually opposite side edges are provided for the supply and drainage and the holes necessary for this makes it possible for the cell frames and the membrane surfaces to be not necessarily square and for the interior space of the electrodialysis chamber not necessarily corresponding to a right parallelepiped with a square base. As explained below, it is nevertheless possible to create more than two separate electrodialysis circulations, which was impossible with previously known membrane stack units.

Apart from the end plates, the entire membrane stack is formed by several cell-frame units. These always consist of two mutually corresponding cell-frame parts as well as a membrane that is selective for one type of ion. The sequence of cell-frame units is guided according to the special application. The individual cell frames always consist of two parts, where the associated ion-selective membrane is disposed on the flat frame surface (i.e. membrane side). Here, the membrane between the cell frames can also exercise an additional sealing function with respect to the neighboring unit, but need not necessarily do so. By the stacking of the respectively other cell-frame surfaces (cell side), one forms a dialysis compartment. Every two mutually neighboring and corresponding cell-frame parts between two membranes are mirror images of one another as regards their structure. In this connection, by a "mirror-image structure" is understood that the two cell-frame parts have a mirror-image structure with respect to a plane running between them parallel to the membrane. This means that not only the infeed and outlet supply holes are disposed precisely above one another and form the above-mentioned channels to the end plates, but also the systems of distribution holes lead from the corresponding supply holes into the respective electrodialysis compartment. The distribution holes of the two mutually neighboring cell-frame parts have an approximately semi-circular cross section, if one looks at each hole by itself. By superposing the two cell-frame parts with their mutual mirror-image structure, one obtains distribution-hole systems parallel to the sealing surface and to the membrane surface, where the individual holes have an approximately circular cross section. The distribution holes are thus defined by the two cell-frame parts, one-half each.

Depending on the required number of process streams, which normally lies in the range from 2 to 4, but which can also be greater than 4 if desired, the corresponding number of supply-hole systems are provided at the side edges of the cell frames. These supply-hole systems make it possible to guide the process streams perpendicular to the membrane plane. The number of these supply holes generally is an integer multiple of the number of process streams, and in practice lies in the range from 4 to 20, but can also be chosen still larger. This number depends further on the width of the compartment and thus on the required membrane surface per cell compartment, since a uniform flow along the membrane surface is guaranteed only when the inflow of the solution being separated is uniform over the entire side length of the compartment and thus over the entire membrane surface. Analogous considerations also apply to the outflow of the solutions. The solution that is flowing through the respective compartment is withdrawn on that side of the electrodialysis compartment which lies opposite the infeed side. This is achieved by means of distribution holes and supply holes of the same geometry and arrangement with respect to one another as the supply holes and distribution holes on the infeed side. According to the invention, all the electrodialysis compartments have the solution flowing through them in the same direction and parallel.

If it should be sensible for a particular application, the process streams can also be conducted in countercurrent, as long as the membranes can sustain the pressure differences which will then form.

The distribution holes are appropriately arranged in systems which always connect only a specific and defined number of supply holes in ray-like fashion with the respective electrodialysis compartment. They are uniformly distributed along one side length of a cell. As a result, the compartments have a uniform inflow and outflow. This results in a hydraulically exactly definable tubular inflow and outflow system for each compartment, i.e. with cell-frame parts that are disposed symmetrically with respect to one another and that are placed one on top of the other. This system guarantees the desired uniform distribution of the particular process stream from the corresponding distribution holes to the compartment, since it is not geometrically variable. The flow distribution is not placed into the compartment itself, since a uniform flow distribution can no longer be defined here. Rather, the process streams are already distributed in the cell-frame region through these distribution systems. As a result, it becomes possible to distribute the process streams among the individual cells in completely uniform fashion. Thus, zones with little mixing of the solutions and zones with increased concentration polarization cannot be formed in the cells.

An important point with the invention as well as with previously known membrane-stack units is an efficient seal of the individual process streams with respect to one another.

In contrast to the prior art, where serious problems always occurred in this respect, a seal of both the penetrating supply holes and individual inflow and outflow systems is achieved on the basis of the flat design of the cell frame. This happens in virtue of the fact that the individual frame parts, as a result of their flat design on one side, and with the membrane on the other side, and without an additional contour seal, are sealed flat with respect to one another and with respect to the environment. This not only significantly improves the seal, but another result is that no voluminous sealing systems are needed for a larger number of membrane units and thus do not cause an unwieldy and uneconomical membrane stack which would be unsuitable for practical application.

Another design simplification results from the fact that two mutually adjoining cell-frame parts, which form one electrodialysis compartment of the membrane-stack unit, are always constructed as mirror images of one another. As a result of this mirror-image structure, one achieves the feature that membrane stacks with up to four separate circulations—which in practice are sufficient for most separation problems—can be constructed of only two different cell-frame types. This simplifies the constructive complication and leads to more economical deployment of the inventive membrane-stack units.

In addition, by means of the inventive system one can construct a membrane stack which, on the one hand, has a strictly parallel flow pattern of the individual separate circulations and, on the other hand, can be varied as regards the membrane surface in virtue of the fact that only the longitudinal sides of the cells can be changed, i.e. can be enlarged or diminished, without the overall dimensions of the membrane stack thereby being subjected to geometric constraints. Precisely the strictly parallel flow pattern in the individual separate circulations, a flow pattern which is uniform in all the cells, has as its consequence that undesirable local pressure differences between the individual chambers can no longer build up, as was the case in previously known units. Correspondingly, the concentration gradients both in the flow direction and also perpendicular to the flow direction are optimal for the separation process due to the design of the cell frame.

Membrane stacks, which are suitable for up to four different process streams for practical application in separation processes, can have up to several hundred cell-frame units, i.e. cells according to the present invention. A decisive factor for the number of individual cells is the particular separation problem, which determines not only the total surface of the separation membranes but also the process path-length for the respective separation process. Depending on the requirements that are characteristic for the special separation problem, the membrane surface and the process path-length can optimally be adapted readily through the number of cell-frame units. In some cases, it may be necessary to enlarge the membrane surface and thus to increase the number of cell units. This leads to quite convenient and practically suitable membrane stacks because a limiting geometric constraint is obviated due to the non-square design of the cell frames.

Figure 1:
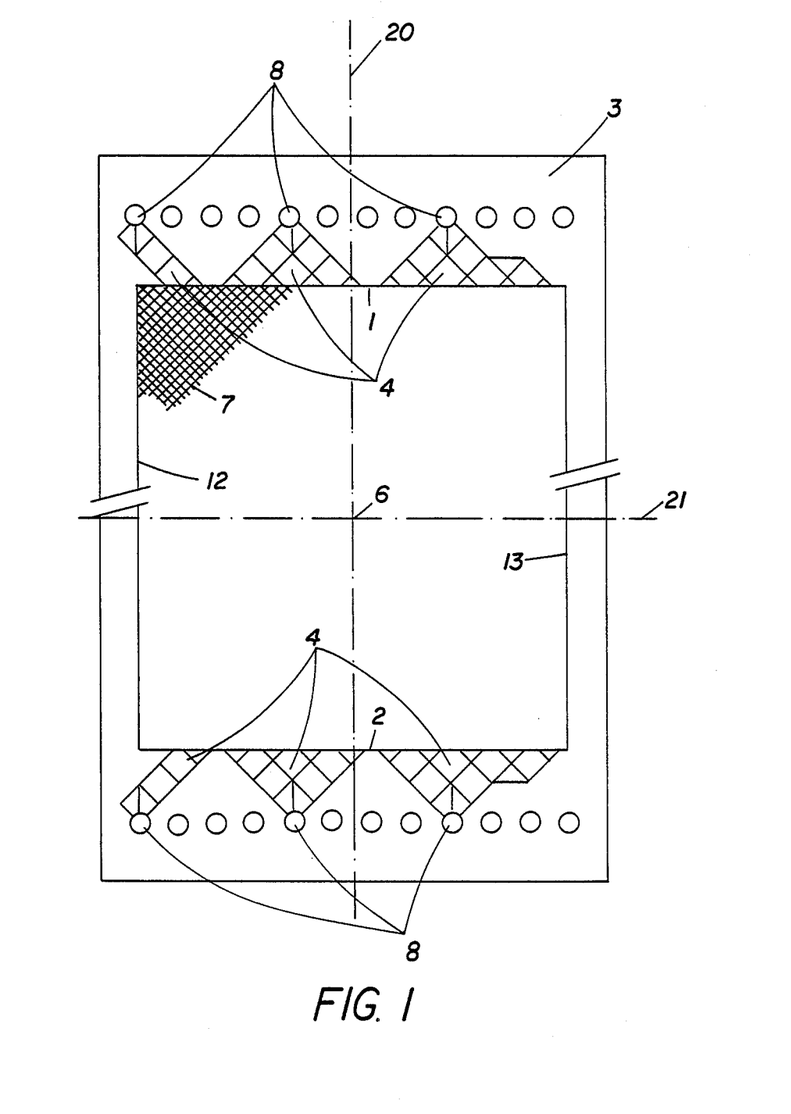
FIG. 1 shows a top view of a divided cell frame of one of the two types that are suitable according to the present invention, namely Type I.

As shown in FIG. 1 of the drawings, the interior side edges 1 and 2 of the rectangular flat-plane cell-frame 3 of Type (I) are situated opposite to one another. They preferably are 0.3 to 1.5 mm thick. They have a large number of channel-like distribution holes, which have a cross section of about 0.04 mm$^2$ to 6.5 mm$^2$ in their finished state, and this cross section is approximately semi-circular. They are gathered together in the systems 4. The solution is conducted through them from the corresponding supply holes 8 into the dialysis compartment 6 which is surrounded by the cell-frame 3. There is a second cell frame of the same Type (I) which has a structure that is mirror-symmetric to the above-described cell frame with respect to the axis 21. It is generated by rotating the frame of Type (I) about the axis 21. It has the corresponding other half of the channel-like flow systems with the same cross section. Thus, by placing the two halves of such mirror-symmetric cell frames on top of one another, one obtains a closed flow system within which the solution to be separated is conducted from the corresponding supply holes 8 through the channel-like tubes into the dialysis compartment 6. The tubular inflow systems are thus hydraulically precisely defined. In virtue of their design, they guarantee a uniform inflow and outflow to and from the cell frame 6 via the two side edges 1 and 2 respectively.

The second cell frame Type (II) (compare FIG. 2) is characterized by the supply holes 9 being connected with the interior of the dialysis compartment 6 through appropriate channel-like distribution holes, as described above, which are gathered in systems 5. Here too, two cell-frame parts of the same Type (II), which have a mirror-symmetric struction with respect to one another over the axis 22, are placed on top of one another—rotation about the axis 21. Thus hydraulically precisely defined tubular inflow and outflow systems are defined for the interior of the cell. One therefore obtains a uniform inflow and outflow to and from the cell frame 6 over the side 1 and over the side 2 respectively.

Figure 2:
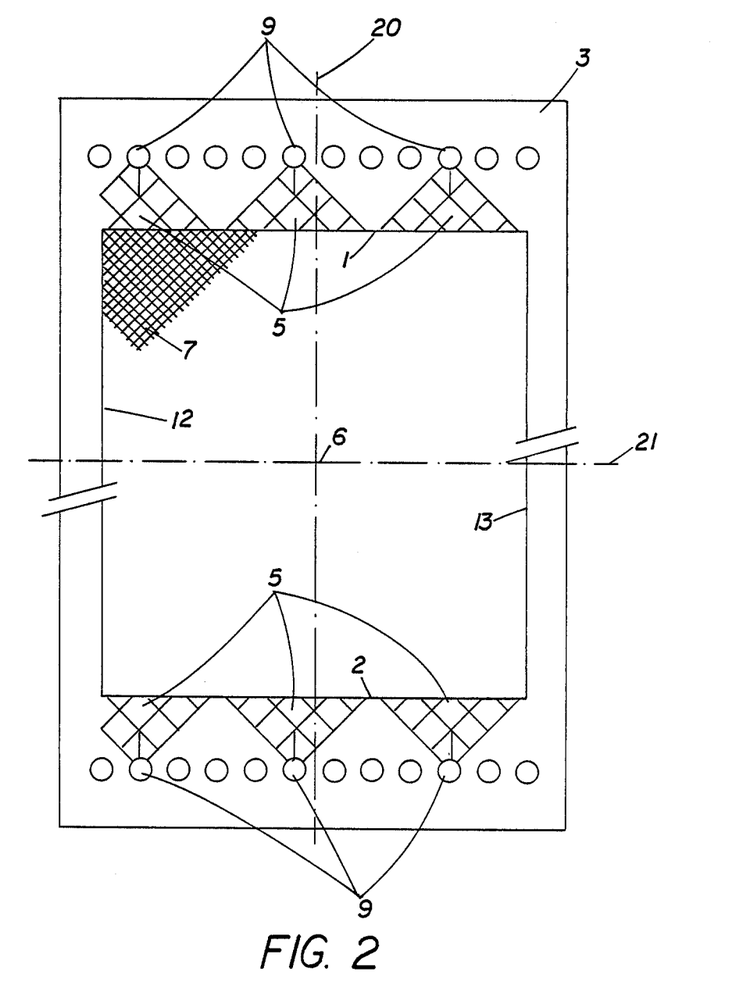
FIG. 2 shows a top view of a divided cell frame of the second type that is suitable according to the invention, namely Type II.

As one can easily see from FIGS. 1 and 2, a separation system with two separate process circulations is defined by means of the two cell-frame Types I and II (in FIG. 1 and FIG. 2 respectively). When the frame type described above is assembled it forms a finished cell. Rotating it about the axis 20 by 180° leads to another cell frame, identical in type, in which—by superposing the respective cell frames—two further supply holes 11 and 10 are present (compare FIG. 3). The hole 11 is produced by this rotation from 8 and the hole 10 is produced from 9. Here, these supply holes likewise receive inflow from the end plates and through them the respective distribution hole systems for the particular cell chamber receives its inflow. The advantages described for FIGS. 1 and 2 naturally hold analogously also for the cell-frame units which define the two further process circulations.

We now consider a cell compartment (corresponding to 6) which is formed from two cell-frames 3 that are placed on top of one another. A net-like fabric 7 is inserted as a spacer for the membranes that lie on both sides. The fabric 7 is matched to the geometric dimensions of the chamber 6. The fabric 7 serves not only as a mechanical support and as a spacer for the membrane, but at the same time also as a promoter of turbulence. In the cell 6, it takes care that uniform turbulence of the flow is generated over the entire membrane surface, and thus the boundary-layer thickness on the membranes becomes definable.

The distribution-hole systems 4 and 5 run parallel to the membrane surface in the cell frame. They are connected with the supply holes 8 and 9 on the side edges of the cell frame 3. The supply holes 8 and 9 in the side edges of the cell frame 3 correspond not only to the holes in the membranes and end plates, but furthermore are also disposed geometrically in such a fashion that, under the rotations of the cell frame 3 of FIGS. 1 and 2, which are necessary to generate a multi-compartment stack, the free flow cross section in these supply holes 8 and 9 and in the supply holes 10 and 11, which correspond to them after rotations (FIG. 3), are preserved all the way through as far as the end plates.

The cell frame 3 in FIG. 1 differs from the cell frame 3 in FIG. 2 only by the design and association of the distribution-hole systems 4 and 5 to the distribution holes 8 and 9. While the supply holes, in their non-associated totality, are disposed symmetric with respect to the axes 20 and 21 of the cell frame, the distribution holes 4 and 5 in Type (I) of FIG. 1 and in Type (II) of FIG. 2 are asymmetric with respect to the axis 20, but are symmetric with respect to the axis 21 (in FIGS. 1 and 2). This combination of symmetry/asymmetry in the flow-conduction devices can produce a multi-compartment membrane-stack with up to four separate circulations, using two different cell-frame Types (I) and (II). Furthermore, the principle of the divided cell frame with the advantages we have presented can be preserved.

The two side edges 12 and 13 of the cell frame 3 do not have a supply and drainage function, according to the membrane-stack that is constructed as described above. Thus, these two sides are unrestrictedly available for a variation of the side length of the cell frame and thus naturally also of the membrane surface and of the process path-length per unit. Thus, the principle described in the present application can also be easily transferred to membrane surfaces of any arbitrary size.

Figure 3:
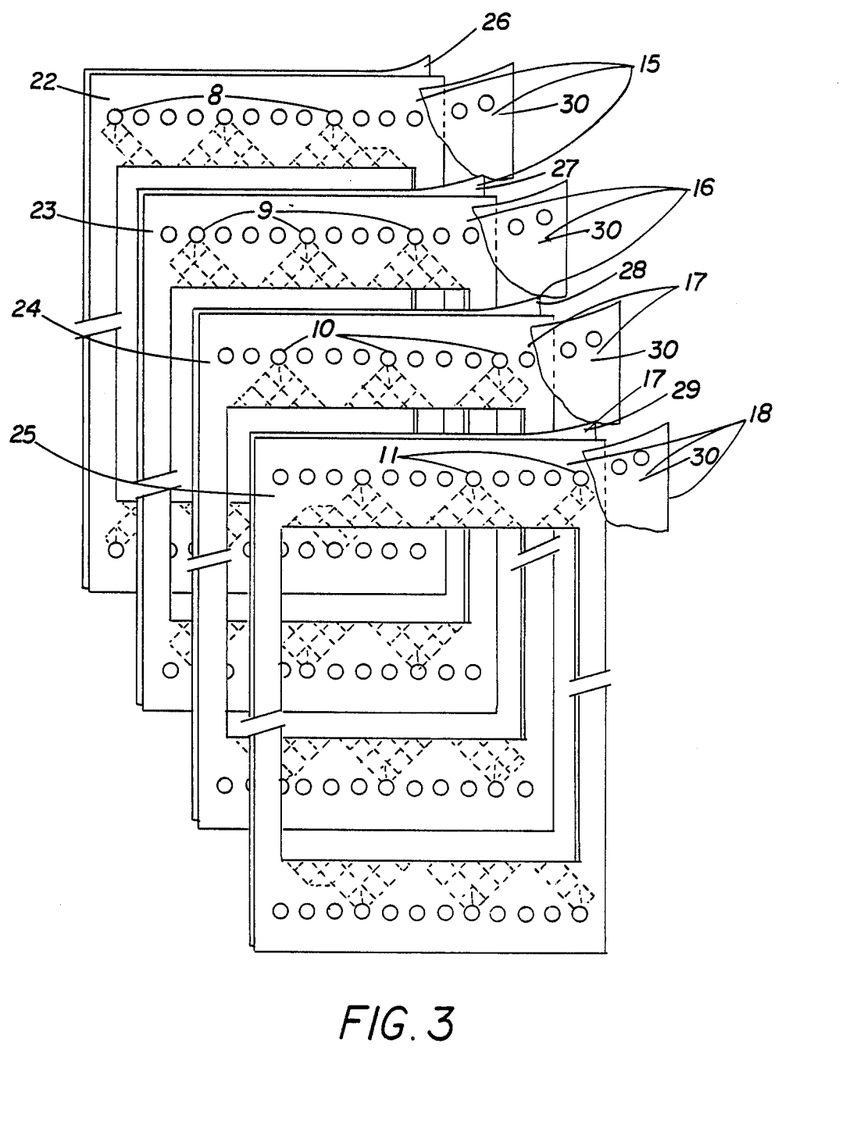
FIG. 3 shows an exploded view of a membrane stack with a top view of four successive cell-frame units, each of which is formed only of two cell-frame parts and one membrane, and which respectively conduct different process streams.

FIG. 3 shows the geometric arrangement of the membrane-stack units described above, according to the present invention. The cell frames 22 and 26 correspond to the above-described cell frames of Type (I), where 26 is a cell frame of Type (I) in the arrangement shown in FIG. 1, and where 22 is obtained by rotating the cell frame shown in FIG. 1 by 180° about the axis 21. Corresponding considerations also hold for the cell frames 27 and 23 in FIG. 3: 27 corresponds to the above-described cell frame of Type (II), which is shown in FIG. 2, while 23 is obtained from the cell frame shown in FIG. 2 by a 180° rotation about the axis 21. The particular cells result from a superposition of the two cell frames which—as already described—have a mirror-symmetric structure in a defined fashion with respect to one another. The holes of the membranes 30 coincide with the supply holes of the cell frames on the two mutually opposite sides. The membranes 30 are disposed between the individual cell frames 22 and 27, 23 and 28, 24 and 29, and continuing between 25 and 26, where the circle closes here. The cell-frame combination 25/29 was generated by a 180° rotation of the combination 22/26 about the axis 20 (compare FIGS. 1 and 2); correspondingly the cell-frame combination 24/28 was generated from 23/27.

As can be seen from FIG. 3, the electrodialysis compartments of the cell-frame combination 22/26 are supplied with solution through the supply holes 8. A total of 4×3=12 holes is shown here on each of the two mutually opposite sides. Here, 4 stands for the number of process streams. For the cell-frame combination 22/26 (counting from the left edge), these are the first, fifth, and ninth holes which are connected via the distribution systems to the interior of the particular compartment that is being formed. The solution is brought in through these supply holes and is conducted into the interior of the cell through the distribution hole systems which emanate star-like from the holes. In FIG. 3, the distribution hole systems are shown by dashes and in reality lie between the halves of the cell frame and thus cannot be seen in the figure. When the solution reaches the interior of the cell, it comes in contact with the membranes 30 that are affixed there on the sides of the cell frames.

The electrodialysis cell which is bounded by the cell-frame combination 23/27 is supplied from the end plates via the holes 9. Again counting from the left edge of the cell frame, these are the second, sixth, and tenth holes. In analogous fashion as with the cell-frame combination 22/26, the solution is conducted into the interior of the cell through the distribution holes (shown by dashes), and there comes in contact with the membranes 30.

Analogous considerations also hold for the cell-frame combinations 24/28 and 25/29, where the supply holes 10 and 11 (counting from the left edge of the cell frame) are the third, seventh, and eleventh, and respectively the fourth, eighth, and twelfth holes on the side edges of the respective cell frames. Here too, the distribution hole systems are shown by dashes, because they are not visible.

From FIG. 3 one can likewise see that the cell frames are always constructed of two mutually mirror-symmetric cell-frame parts, which are designated 22 through 29 in their different spatial positions. The individual cell frames, as described above, are always separated from one another by a membrane.

The system described in FIG. 3 differs from the square systems of the prior art in virtue of the fact that the conventional cell-frame systems always could house only two process circulations, with one cell supply in two mutually opposite sides of the cell frame. Four circulations were generated in virtue of the fact that all four sides of this frame were drawn upon for the inflow and outflow to and from the cells. This results in the already described disadvantages which accrue to the above-described diagonal flow patterns, which are turned by 90° from cell to cell. In contrast to this, with the multi-compartment membrane-stack unit according to the invention, the supply and drainage of the electrodialysis cells, for example, four separate circulations are housed in only two mutually opposite sides of a rectangle. This is done in the form that a uniform inflow and outflow to and from the cell compartment in every cell is guaranteed with the same reliability. Thus a strictly parallel process path is forced by the inventive arrangement.

Figure 4:
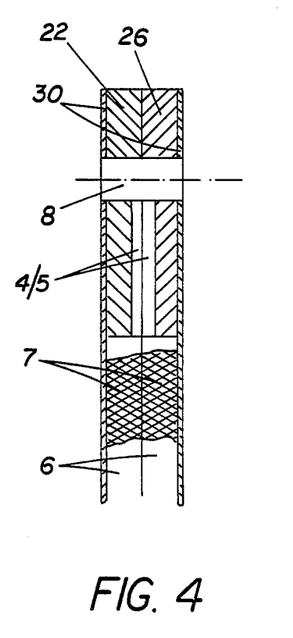
FIG. 4 shows a section through an inflow system into the cell frame.

This is again clarified in FIG. 4. Here, 22 and 26 represent the two mirror-symmetric cell-frame parts, one of whose sides has affixed to them the flat frame with a membrane 30. The solution which is to be separated is brought in through the supply holes 8. It is conducted through the distribution holes from systems 4 and 5 into the interior of the cell 6, and thus is exposed to the electric field. The electric potential difference causes a separation of the cations and anions, which can pass only the membrane that is specific to them. The solution flow in the interior of the electrodialysis cell 6 thus becomes depleted in ions or becomes concentrated, depending on the arrangement of membranes. To support the membrane and to improve the flow pattern in the overall system, one makes use of the netlike fabric 7 which is matched to the size of the compartment 6 in its geometric dimensions.

Figure 5:
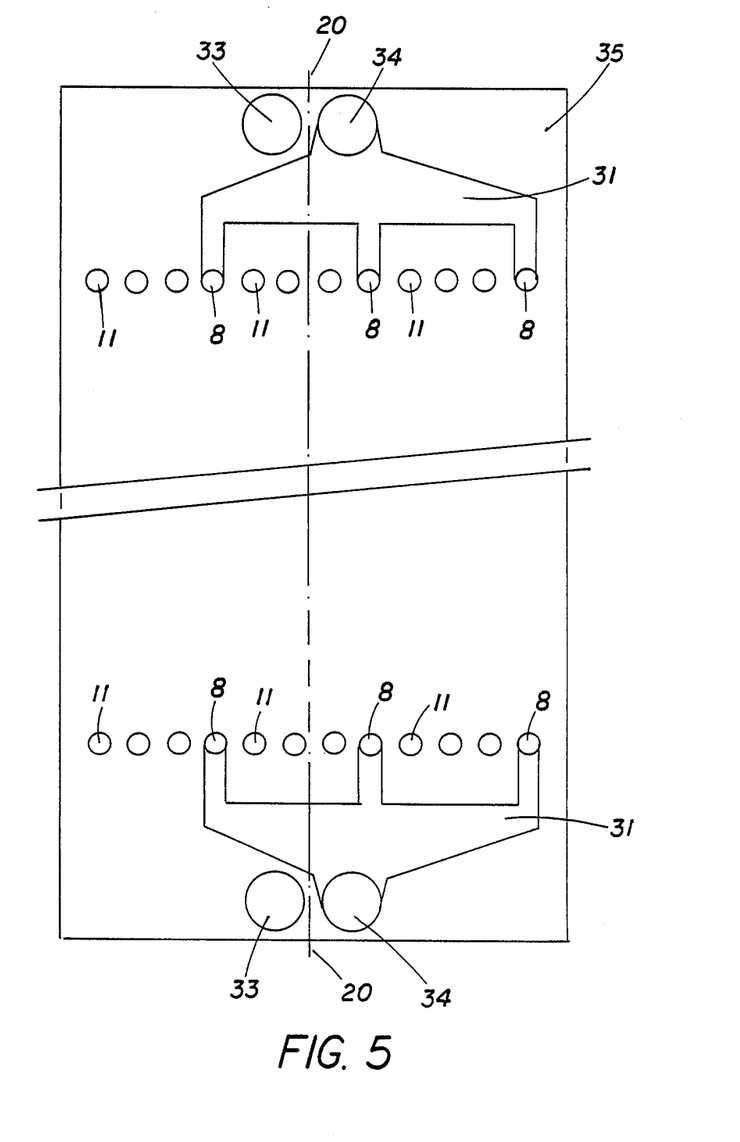
FIGS. 5 and 6 show top views of the two end-plate layer types with the different supply systems for the supply holes that are situated on the cell frame.
Figure 6:
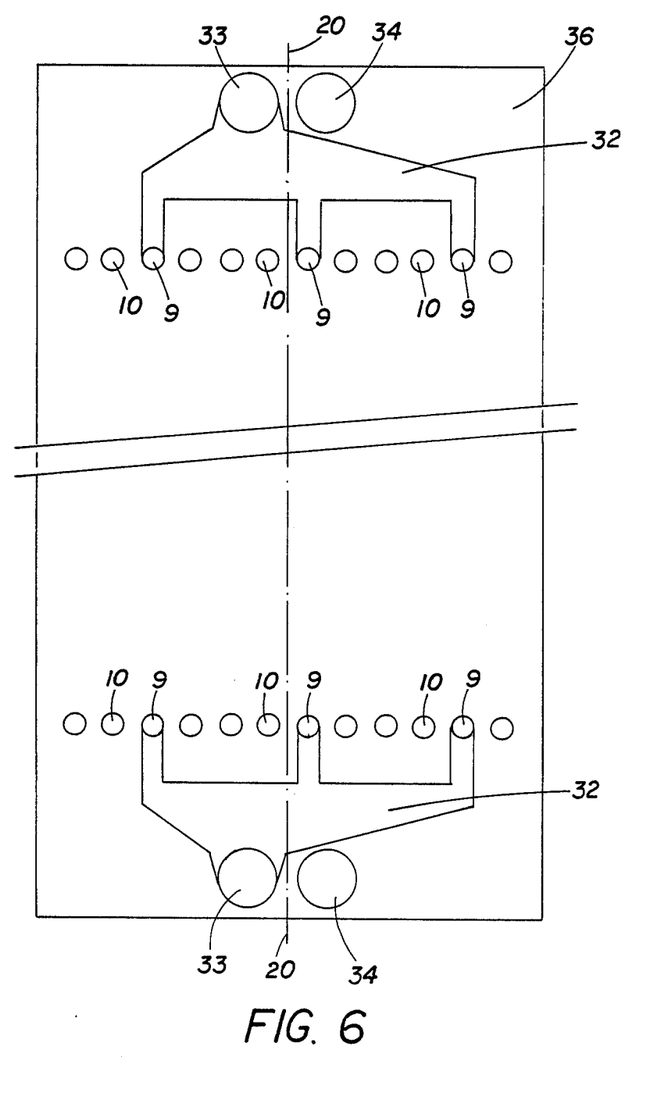

In actual application, appropriately premounted units 15, 16, 17, and 18 (FIG. 3), consisting of a sequence of frame, membrane, frame, are stacked in the fashion described above. These prefabricated units have the advantage that the very sensitive membranes are placed at a suitable location between the cell frames and there can also be fastened to such an extent that they are at least somewhat protected for further processing. The further processing often takes place under conditions that are not tolerable for the membranes. Furthermore, this considerably simplifies the stacking. FIG. 5 shows a top view of an end plate 35. Through inflow and outflow holes 34 and through a distribution and collection system 31, this end plate supplies and drains the membrane stack for a solution circulation on the supply holes 8. By rotating the end plate 35 about the axis 20, one obtains (with the same end plate type) a further end plate, which supplies and drains the supply holes 11, thus forming the second circulation. The holes 33 which are shown in FIG. 5 are those penetration holes for the inflow and outflow of the neighboring end plate layer, which is shown in FIG. 6. The end-plate layer 36 as shown in FIG. 6 supplies and drains the supply holes 9, via the holes 33 and the distribution systems 32, in correspondence with the explanations given for FIG. 5. This results in the third circulation. Correspondingly, this end plate 36 can also be rotated at 180° about the axis 20. It is then possible to supply the supply holes 10, which corresponds to the fourth circulation.

The supply holes 8, 9, 10, and 11 naturally are adapted in terms of numbers and in terms of geometry to the respective cell frames. They distribute the four separate circulations among the individual membrane compartments. Just like the holes 33 and 34, they are symmetric with respect to the axis 20. Thus these holes remain congruent in the system under the rotations of the end plates 35 and 36 about the axis 20, rotations which are necessary to generate the inflow and outflow of four separate circulations. The different asymmetry of the distribution systems 31 and 32 with respect to the axis 20, and the rotation of the end plates 35 and 36, generates the four separate circulations which are required for the solutions which are being separated. FIG. 7 once again clarifies this principle. An entire end-plate unit (viewed from the membrane stack) is built up of the plate layers 35, 36, 39, 37 and 38. The plate layer 38 is a plate layer 35 rotated about the axis 20; correspondingly, the plate layer 37 is a plate layer 36 rotated about the axis 20.

Figure 7:
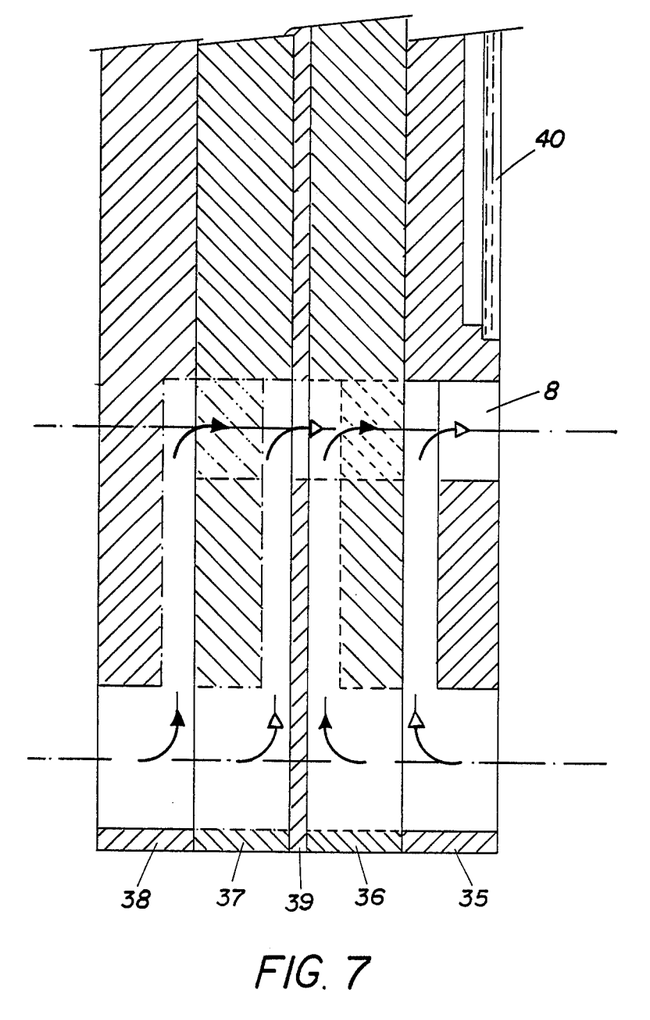
FIG. 7 shows a section through one end-plate unit for four separate process circulations.

The two different systems are separated by a sealing plate 39 which essentially has only the supply holes 8, 9, 10 and 11 and otherwise seals the two systems 35, 36 and 37, 38 with respect to one another. Furthermore, the plate layer 35, which is turned towards the membrane stack, contains the electrode cell 40. This electrode cell 40 is flushed through a separate circulation, which is not shown here. The electrode cell 40 furthermore accepts the particular electrode that is involved.

Figure 8:
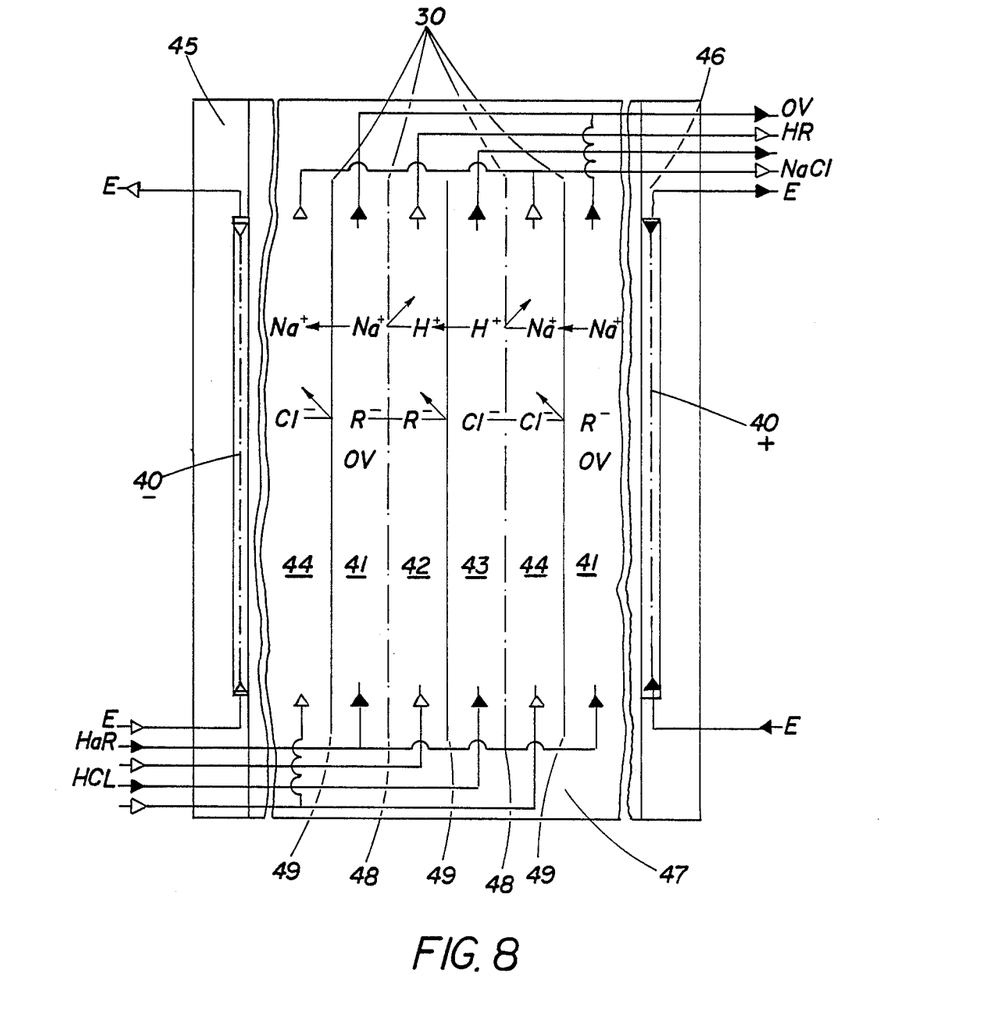
FIG. 8 shows a diagram of a membrane-stack unit consisting of four compartments.

Another feature of the end-plate layer system can be found in the fact that four separate circulations are generated from the two end-plate types 35 and 36 (FIG. 5 and FIG. 6 respectively) by using the sealing plate 39. By means of these circulations, the above-described membrane-stack units are supplied with solution or the solution can be drained from them. The distribution and collection systems 31 and 32 can be optimized from the point of view of flow. They advantageously guarantee that no pressure difference between the individual separate circulations can build up in this end-plate unit, as is also the case in the stack unit. Furthermore, it is to be regarded as advantageous that the end-plate units can be manufactured relatively easily, due to the limited number of individual system components. This leads to considerable cost savings. End-plate systems can also be conceived which respectively only feed or drain a membrane stack. FIG. 8 shows, by way of example, a diagram of a membrane stack with four process circulations. Electrodialysis compartments 41, 42, 43, and 44 are sealed off against one another through cation exchange membranes 49 and anion exchange membranes 48. Through the supply holes and distribution systems which have been explained in the previous figures, they are supplied with the respective solutions. Here, the solution to be purified can, for example, contain a water-soluble alkali-metal salt, e.g. a sodium salt of an organic acid (NaR), as well as non-ionic organic impurities (OV). The solution is fed in through the compartments 41 and is to be freed of ionic impurities, the impurities are to be concentrated, and are to be brought over into the corresponding free acid.

FIG. 8 furthermore shows the respective end-plate units with equipment for the intake and outflow of the solution being treated as well as the corresponding supply and connection systems as well as the respective electrodes 40.

After electric voltage is applied to the electrodes 40, of which the anode is shown on the right side and the cathode on the left side, the individual ions are transported selectively through the respective membrane when the solution flows through the respective dialysis compartments. Here the cations migrate from the two chambers 41 through the cation-selective membranes 49 into the adjacent compartments 44. The anions migrate through the anion-selective membrane 48 into the adjacent chamber 42, so that the contaminated solution is desalinated and only the non-ionic, organic impurities OV remain therein, which are not transported in the electric field.

A strong acid, for example an inorganic acid such as hydrochloric acid, is conducted to the electrodialysis compartment 43. In the electric field, the cations of this acid migrate through the cation-selective membrane 49 into the adjacent electrodialysis compartment 42, while the anions migrate through the anion-selective membrane 48 into the adjacent compartment 44. Thus, the pure organic acid (HR) is produced in the compartment 42. This organic acid can be withdrawn through appropriate drainage systems. On the other hand, the solution being purified is withdrawn from the compartments 41, possibly with non-ionic organic impurities (OV). Furthermore, a solution enriched with sodium chloride ions is obtained from the compartments 44.

The result is a purified, concentrated organic acid and a more concentrated salt solution which, in the present example, yields sodium chloride as a by-product.

The inventive membrane-stack units can be deployed in a large number of applications. From the large number of applications, we mention only the purification and desalination of seawater or brackish water, the production of boiler feedwater that is low in ions, the purification of rinsing solutions for electroplating processes with recovery of valuable materials, electrodialysis processes in the manufacture and purification of foodstuffs, electrodialysis process in the pharmaceutical manufacturing processes, or also water dissociation by electrodialysis with the use of bipolar membranes. Precisely in the last process, membrane stacks with up to four separate process circulations must be available. Even now, large membrane surfaces are used in this application. By using the inventive membrane-stack units, these can easily be realized and can be optimized in terms of process, in a membrane stack.

Furthermore, for example, the inventive membrane-stack units can manage systems involving three-compartment processes. For example, amino acids generated from the hydrolysis of proteins can be separated from an amino-acid mixture if their isoelectric points lie at different pH values. An appropriate pH value setting of the raw solution is used to cause opposite charges on the various amino acids. The differently charged amino acids are then separated from one another in a three-compartment process with an alternating membrane sequence, consisting of a cation exchange membrane and of an anion exchange membrane.

What is claimed is:

1. In an electrodialysis apparatus comprising a series of cells formed of rectangular frames stacked in sealed contact with an interposed membrane between adjacent frames, each frame having a plurality of through liquid inlet apertures along one margin of said frame and a plurality of through liquid outlet apertures along the opposing margin of said frame in position to mate with corresponding apertures of every other frame and membrane of said stack, the improvement which comprises a first frame having at least one set of at least four said apertures along each opposite margin, one corresponding aperture of each set having channels communicating with the central compartment within said frame, a second frame identical to the first turned 180° about an axis parallel to the plane of said first frame and perpendicular to said opposite margins, a third frame identical to said first frame except that said aperture of each set communicating with the central compartment within said third frame is different from the communicating aperture of each set of said first frame and also different from the communicating aperture of the mirror image of said first frame, a fourth frame identical to said third frame and turned 180° about an axis parallel to the plane of said third frame member and perpendicular to said opposite margins, said frames being arranged in any desired sequence in said stack, whereby liquid flowing through a single sequence of mating apertures communicates with the interior compartment of only a single frame, and the liquid flow within the interior compartment of each frame is from said one margin to said opposing margin.

2. An electrodialysis apparatus as claimed in claim 1 wherein each said frame comprises a pair of mirror-image opposing frame members sealed in face to face contact, each said member having through apertures mating with the other and having an array of half-channels in its opposing face arranged to mate with the array on its opposing member to form said communicating channels of said frame.

3. An electrodialysis apparatus as claimed in claim 1 or 2 in which at least three sets of said apertures are present in each opposing margin of each frame.

4. An electrodialysis apparatus as claimed in claim 1 or 2 in which a net-like fabric is disposed within the central space of each said frame between membranes.

5. An electrodialysis system as claimed in claim 1 or 2 in which at least three sets of said apertures are present in each opposing margin of each frame and in which a net-like fabric is disposed within the central space of each said frame between membranes.

* * * * *